United States Patent

Strickrodt et al.

[15] 3,705,921
[45] Dec. 12, 1972

[54] METHOD OF PREPARING β-METHYL ADIPIC ACID

[72] Inventors: Jorg Strickrodt, Laatzen; Gotthard Engemann, Salzgitter-Bad; Hans-Gerd Eulenhofer, Salzgitter-Lebenstedt, all of Germany

[73] Assignee: Veba-Chemie Nord GmbH, Gelsenkirchen-Buer, Germany

[22] Filed: March 13, 1970

[21] Appl. No.: 19,494

[30] Foreign Application Priority Data

April 26, 1970 Germany..........P 19 21 441.6

[52] U.S. Cl.............................260/531 R, 260/537 P
[51] Int. Cl................................................C07c 55/04
[58] Field of Search........................260/531 R, 537 P

[56] References Cited

UNITED STATES PATENTS 2,300,955  11/1942  Mier .....................260/531 R

FOREIGN PATENTS OR APPLICATIONS 1,205,516  11/1965  Germany ...............260/531 R
265,959  12/1927  United Kingdom....260/531 R Primary Examiner—Lorraine A. Weinberger
Assistant Examiner—Richard D. Kelly
Attorney—Burgess, Dinklage & Sprung

[57] ABSTRACT

In the process of producing β-methyl adipic acid from a mixture of para and meta methylcyclohexanol by oxidation with nitric acid for a time and at a temperature sufficient for production of the β-methyl adipic acid, and cooling of the reaction product for precipitation of the β-methyl adipic acid and formation of a mother liquor, the improvement which comprises utilizing in the reaction as the source of para and meta methylcyclohexanol a hydrogenated crude cresol mixture which contains as well as para and meta methylcyclohexanol, up to 20 percent of ortho methylcyclohexanol or cyclohexanol or ortho methylcyclohexanol and cyclohexanol.

5 Claims, No Drawings

METHOD OF PREPARING β-METHYL ADIPIC ACID

The subject of this invention is a process for preparing β-methyl adipic acid of great purity from a methylcyclohexanol mixture which may also contain cyclohexanol.

From Example 1 of DAS No. 1,205,516 it is known that a very pure β-methyl adipic acid is obtained from a mixture of m-methylcyclohexanol and p-methylcyclohexanol by oxidation with nitric acid. As it is stated in said Auslegeschrift, however, either pure p-methylcyclohexanol or a mixture of p-methylcyclohexanol and m-methylcyclohexanol containing no more than 70 percent of the meta compound must be used in order to obtain β-methyl adipic acid.

The starting substance for the preparation of β-methyl adipic acid according to the invention is the methylcyclohexanol mixture that is produced by the hydrogenation of crude cresol from the processing of tar. Often this methylcyclohexanol mixture still contains cyclohexanol, because the separation of phenol from the cresols can be difficult. Since the distillative breakdown of crude cresol into m- and p-cresol on the one hand and o-cresol on the other is technically very complicated and expensive, it appeared desirable to use the substantially cheaper crude cresol as the starting material for the process of the invention.

The process of the invention for the preparation of β-methyl adipic acid from a methylcyclohexanol mixture by oxidation with aqueous nitric acid, cooling the oxidation mixture and separating the precipitated dicarboxylic acid is characterized in that a hydrogenated crude cresol misture which may contain up to 20 percent o-methylcyclohexanol and cyclohexanol is used as the starting material.

In this process, a portion of the mother liquor that is produced can be let out and restored to a nitric acid content of 50 to 70 percent by concentration and/or by the addition of highly concentrated nitric acid, and can be returned to the reaction process.

Preferably the oxidation of the methylcyclohexanol-cyclohexanol mixture is performed continuously.

The process of the invention, therefore, starts with hydrogenated commercial crude cresol obtained by the hydrogenation of commercial crude cresol containing m- and p-cresol and up to 20 percent o-cresol or up to 20 percent o-cresol and phenol, or up to 20 percent phenol. The hydrogenated crude cresol of the said composition is oxidized with 50 to 70 percent nitric acid solution, with or without the addition of a catalyst, at a suitable temperature, which can be 50° to 75° C, preferably 60° to 70° C, e.g. at 60° C. After the mixture is cooled, for example to −10 to +25° C, a nearly pure β-methyl adipic acid having a melting point of 95° C precipitates. The compound was identified by the dianilide, according to W. Markownikoff in "Liebigs Annalen," No. 336, p. 302 (1904). Surprisingly, the adipic acid that forms in the oxidation does not precipitate when the starting material according to the invention is used and the stated working conditions are maintained, although it is more poorly soluble in the nitric acid used for the oxidation than β-methyl adipic acid. This is attributed to the manner in which the solubility is affected by short-chain carboxylic acids which develop as by-products.

If cooling to +10° C is performed as stated above, a very pure β-methyl adipic acid separates in a yield of about 60 percent with reference to the starting mixture of m- and p-methylcyclohexanol. As previously stated, the mother liquor is restored to a content of 50 to 70 percent $HNO_3$ either by concentrating it or by the addition of anhydrous nitric acid, and it is returned to the oxidation process. Since, however, the adipic acid formed from o-methylcyclohexanol and cyclohexanol concentrates in the mother liquor, a portion of the mother liquor has to be purged. If this purged portion is processed for β-methyl adipic acid, the yield increases from 60 to 91 percent on the basis mentioned above.

EXAMPLE 1

57 g of a hydrogenated commercial cresol mixture (76 percent p-methylcyclohexanol, 12 percent m-methylcyclohexanol and 12 percent o-methylcyclohexanol and cyclohexanol) were added, with stirring, to 154.1 g of 66 percent nitric acid containing 0.16 wt. percent of ammonium vanadate and 0.4 wt. percent of copper sulfate, over a period of 30 minutes in such a manner that a reaction temperature between 60° and 65° C was established. After the addition of the alcohol had ended, the mixture was allowed to react for another half hour, and then it was cooled to 10° C. As soon as crystallization was complete, the mixture was filtered, 40.3 g of β-methyl adipic acid being obtained, equal to 57.2 percent of the theory with reference to m- and p-methylcyclohexanol.

Acid number: 703
Melting point: 95° C.

The mother liquor obtained in the experiment was concentrated in vacuo and restored to the initial 66 percent concentration with 96 percent nitric acid solution. By the use of this mother liquor under the conditions described above (i.e. using this liquor as the nitric acid in the main reaction), the yield of β-methyl adipic acid was increased to 64 g = 91 percent.

EXAMPLE 2

The oxidation was performed continuously, the circulation of the acid between a reactor, a degasser and a cooler being accomplished by the driving action resulting from the production of gases. In larger apparatus the use of a circulating pump would be advisable. 750 g of methylcyclohexanol mixture plus 2 kg of 67 percent nitric acid containing 0.1 percent of the catalyst mixture used in Example 1, were injected hourly through nozzles into the reactor. An aliquot portion of the product was continuously withdrawn ahead of the cooler through a separate cooler. The oxidation solution was cooled to 10° C and the β-methyl adipic acid that separated was removed by filtration.

In this experiment a different commercially available hydrogenated cresol mixture was used, which consists of 50 percent p-methylcyclohexanol and 34 percent m-methylcyclohexanol, plus 16 percent cyclohexanol and o-methylcyclohexanol. 505 g per hour of β-methyl adipic acid were obtained, which corresponds to a yield, with reference to m- and p-methylcyclohexanol, of 57 percent.

The process can be operated with recycling. The mother liquor was concentrated by evaporation. 25 percent of the concentrated liquor was purged and the balance was reconstituted with 1.4 kg of 96 percent aqueous nitric acid to again make a 67 percent acid solution for use in the process. Otherwise the same procedure described above was followed. The reaction of this reconstituted mother liquor with 750 g per hour of the hydrogenated cresol mixture mentioned above resulted in 735 g of β-methyl adipic acid per hour (= 83 percent of the theory).

What is claimed is:

1. Process of producing β-methyl adipic acid comprising:
   a. oxidizing a mixture of para and meta methylcyclohexanol and cyclohexanol containing up to 20 percent of ortho methylcyclohexanol or cyclohexanol or ortho methylcyclohexanol and cyclohexanol, obtained by hydrogenation of a crude cresol mixture derived from tar, with nitric acid at a temperature of 50° to 75° C. in the presence of ammonium vanadate -copper sulfate catalyst, to produce a reaction liquor containing β-methyl adipic acid and adipic acid;
   b. cooling the reaction liquor to 10° C to precipitate β-methyl adipic acid and form a mother liquor containing adipic acid.

2. Process according to claim 1, wherein the precipitated reaction product is removed from the mother liquor, the mother liquor contains nitric acid and part of the mother liquor is recycled for use in the oxidation reaction.

3. Process according to claim 1, said crude cresol mixture containing 12–20 percent of ortho methylcyclohexanol and cyclohexanol.

4. Process according to claim 1, the precipitated beta methyladipic acid having an acid number of 703 and a melting point of 95° C.

5. Process according to claim 1, said β-methyl adipic acid being nearly pure, having a melting point of about 95° C.

* * * * *